United States Patent
Bramante

[11] Patent Number: 6,029,340
[45] Date of Patent: Feb. 29, 2000

[54] METHOD AND DEVICE FOR AUTOMATED ASSEMBLING OF CONE HALF-BITES OF A VALVE OF AN INTERNAL COMBUSTION ENGINE

[75] Inventor: Giuseppe Bramante, Sant'Ambrogio, Italy

[73] Assignee: Comau S.p.A., Turin, Italy

[21] Appl. No.: 09/025,782

[22] Filed: Feb. 19, 1998

[30] Foreign Application Priority Data

Mar. 18, 1997 [IT] Italy .................................. TO97A0218

[51] Int. Cl.[7] ...................................................... B23P 21/00
[52] U.S. Cl. .................................. 29/705; 29/714; 29/249
[58] Field of Search .............................. 29/771, 787, 798, 29/813, 215, 809, 888.4, 888.41, 888.46, 258, 259, 261, 252, 407.01, 407.08, 705, 714, 249; 73/119 R; 33/611, 533

[56] References Cited

U.S. PATENT DOCUMENTS

| | | | |
|---|---|---|---|
| 2,479,606 | 8/1949 | Douglass | 73/37.5 |
| 3,314,136 | 4/1967 | Giles | 29/249 |
| 3,568,292 | 3/1971 | Kasper | 29/249 |
| 3,793,999 | 2/1974 | Seiler et al. | 29/215 |
| 3,810,296 | 5/1974 | Spontelli | 29/407.08 |
| 4,095,324 | 6/1978 | Lawson | 29/249 |
| 4,364,161 | 12/1982 | Stading | 29/407.08 |
| 4,494,306 | 1/1985 | Immonen | 29/809 |
| 4,667,388 | 5/1987 | Browning | 29/249 |
| 5,033,190 | 7/1991 | Gray | 29/407.08 |
| 5,761,785 | 6/1998 | Connolly | 29/249 |

Primary Examiner—David P. Bryant
Assistant Examiner—Jermie E. Cozart
Attorney, Agent, or Firm—Sughrue, Mion, Zinn, Macpeak & Seas, PLLC

[57] ABSTRACT

An inserting device for automated assembling of cone half-bits on the stem of a valve of an internal combustion engine, has an inner chamber at one end which is isolated from outside due to the engagement of the inserting device on the end of the valve when this device carries out the assembling of the cone half-bits. Immediately after assembling, pressurized air is introduced into this chamber and a check is carried out on whether there are any pressure losses in this chamber caused by air leakages due to improper assembling of the cone half-bits.

4 Claims, 4 Drawing Sheets ional European patent application of the Applicant. -->
METHOD AND DEVICE FOR AUTOMATED ASSEMBLING OF CONE HALF-BITES OF A VALVE OF AN INTERNAL COMBUSTION ENGINE

BACKGROUND OF THE INVENTION

The present invention relates to a method and a device for automated assembling of cone half-bits of a valve of an internal combustion engine.

According to the conventional art, a valve of an internal combustion engine comprises a mushroom-shaped body including a stem on whose free end a cup element is secured having a conical inner surface tapering towards the mushroom shaped head of the valve, and an outer annular flange for abutment of one or more return helical springs for the valve, said cup element being secured on said end of the valve stem with the interposition of an annular body having an outer conical surface, also tapering towards the mushroom-shaped head of the valve, which is defined by two cone half-bits which are freely in contact with each other at a plane containing the axis of said annular body, said cone half-bits defining one or more inner circumferential ribs in their assembled condition which engage corresponding circumferential grooves provided on said end of the valve stem.

In his previous European patent application EP-A-0 708 228, the same Applicant has proposed a method for automated assembling of the cone half-bits on the valve stem, wherein the above mentioned two cone half-bits are mounted by causing them to slide on the valve stem while keeping them temporarily in a diverging condition, with their ends of lower diameter spaced apart from each other. In this previous patent application, the applicant has also proposed a device for carrying out the above mentioned method, comprising means for mounting said cone half-bits by causing them to slide on the valve stem while holding them in a diverging condition, with their ends of lower diameter spaced apart from each other, wherein said means included a tubular body adapted to be moved along an axis coincident with the axis of the valve stem and adapted to engage the annular flange of the cup element, said tubular body being further provided with a plurality of jaws which are elastically deflectable outwardly in a radial direction and having inner inclined surfaces, diverging from each other towards the mushroom-shaped head of the valve and adapted to engage the end surfaces of greater diameter of the two cone half-bits, said inserting device further including a pushing rod, slidably mounted within the tubular body and ending with a tip which is to be introduced between the two cone half-bits and for cooperation with the above mentioned jaws for holding the two cone half-bits in the said diverging position until they reach their assembling position on the stem.

The device which has been previously proposed by the Applicant is used in an automated assembling line for assembling an internal combustion engine. In order to check the proper mounting of the cone half-bits on the valve stem, it would be generally necessary to provide a further station for checking the quality of assembling in said line, downstream of the station for automated assembling of the cone half-bits.

SUMMARY OF THE INVENTION

The object of the present invention is that of further improving the previously proposed device, in order to render the device able not only of assembling the cone half-bits, but also of checking the quality of assembling after that assembling has been carried out, without requiring thereby the provision of a further station to this end.

In view of achieving this object, the invention provides a method of the above indicated type, characterized in that after that the two cone half-bits have been assembled, pressurized air is introduced into a closed chamber facing the end of the valve stem carrying the cone half-bits, and a check is carried out on whether there are losses of pressure within said chamber caused by air leakages due to improper assembling of the cone half-bits.

The invention naturally also provides the device for carrying out the above mentioned method, which has all the features of the previously proposed inserting device which have been indicated in the foregoing and is further characterized in that the above mentioned tubular body of the inserting device defines an end chamber inside thereof which is closed by said flange of the cup element when the flange is engaged by the inserting device, and in that it further includes means for feeding pressurized air to said chamber and means to check any pressure losses in said chamber caused by air leakages due to improper assembling of the cone half-bits.

BRIEF DESCRIPTION OF THE DRAWINGS

The invention will be now described with reference to the annexed drawings, given purely by way of non-limiting example, in which.

DETAILED DESCRIPTION OF THE INVENTION

Figure 1:
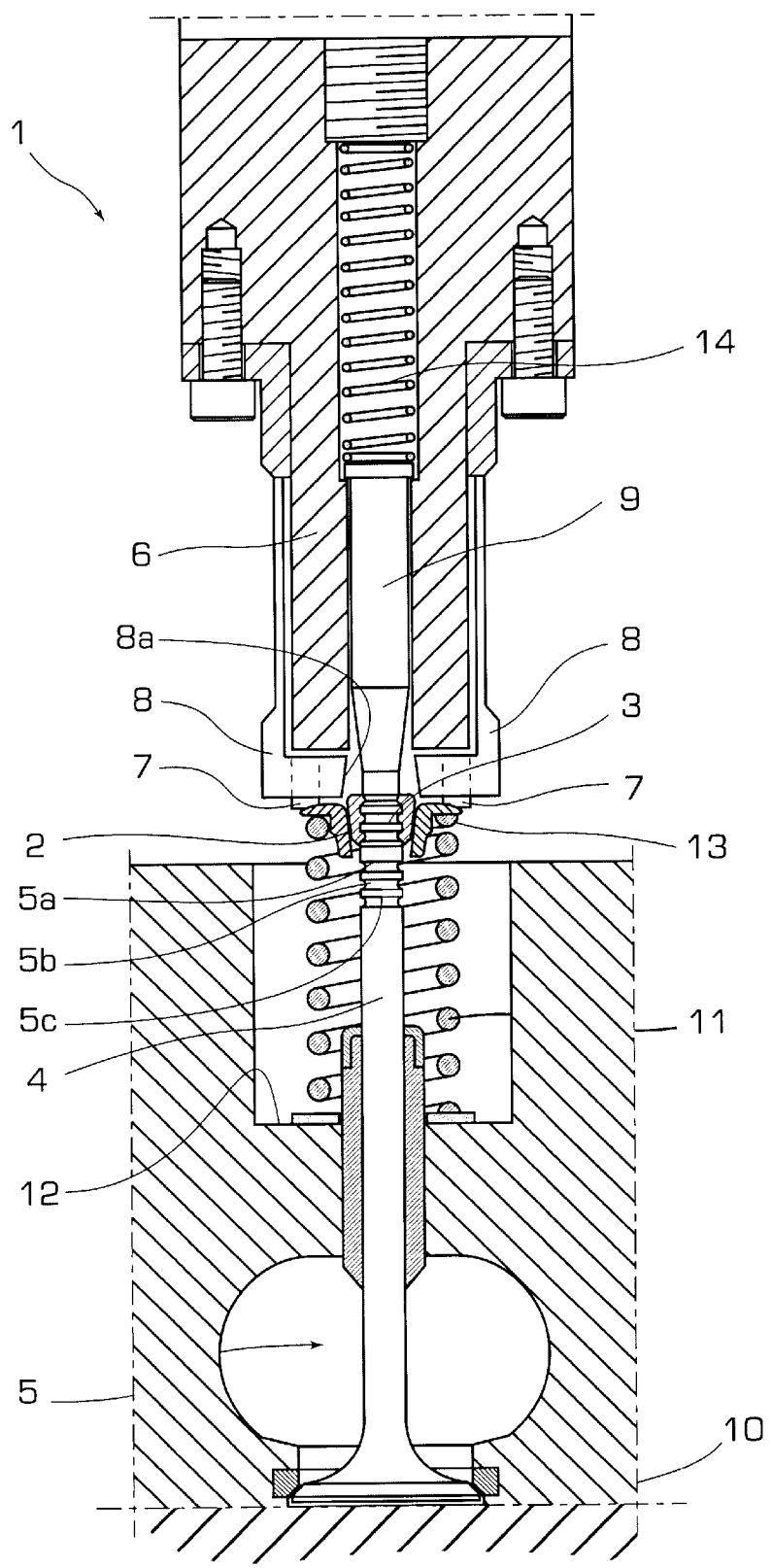
FIG. 1 is a cross-sectional view of a device for assembling the cone half-bits on a valve of an internal combustion engine, according to what has been proposed in European patent application No. 0 708 228 of the Applicant.

FIG. 1 shows a device 1 for automated assembling of the cone half-bits 2, 3 on the upper end of the stem 4 of a valve 5 of an internal combustion engine, according to what has been illustrated in previous European patent application EP-A-0 708 228 of the same Applicant. The device 1 comprises a tubular body 6 provided at its front end with a plurality of pushing fingers 7 equiangularly spaced, as well as with a plurality of jaws 8, which are elastically deflectable outwardly in a radial direction, and having inner inclined surfaces 8a, diverging from each other towards the mushroom-shaped head of the valve 5 and adapted to engage the end surfaces of greater diameter of the two cone half-bits 2, 3. The device 1 further comprises a pushing rod 9 slidably mounted within the tubular body 6 and ending with a tip which is to be introduced between the two cone half-bits 2, 3 and for cooperation with the jaws 8 for holding the cone half-bits 2, 3 in a diverging position, with their ends of lower diameter spaced from each other, in order to enable the two cone half-bits to be lowered on the stem 4 of the valve until they reach the proper assembling position, to which the two cone half-bits can snap with their inner circumferential ribs in engagement into cooperating grooves 5a, 5b, 5c of stem 5. The operation of the inserting device 1 shown in FIG. 1 is as follows. The valve 5 is positioned so as to rests with its mushroom-shaped head against a stop surface 10, whereupon the conventional helical spring 11 associated with the valve is mounted, so that it rests on the respective supporting surface 12. On the upper end of spring 11 the conventional cup element 13 is placed having a central inner hole and the two cone half-bits 2, 3 are positioned inside thereof so as to form an annular conical body resting against the inner conical surface of the cup element 13. At this time, the inserting device 1 is lowered, by displacing means of any known type (not shown) so that the pushing fingers 7 of the tubular body 6 move the cup element 13 downwardly, pressing spring 11. At the same time, the tip of the pushing rod 9 is introduced through the two cone half-bits until it stops against the top surface of the stem 4 of valve 5. Once this condition has been reached, the tubular body 6 keeps on moving downwardly, causing compression of a return spring 14 associated with the pushing rod 9, so as to cause engagement of the deflectable jaws 8 on the outer surface of the two cone half-bits 2, 3. Following this engagement, as well as the engagement of the pushing rod 9 inside the two cone half-bits, the latter are held in a diverging condition, with their ends of lower diameter spaced apart from each other, until the cone half-bits reach, with their downward movement, the proper assembling position, to which they can snap with their circumferential inner ribs in engagement into respective circumferential grooves 5*a*, 5*b*, 5*c* of the valve stem.

Figure 2:
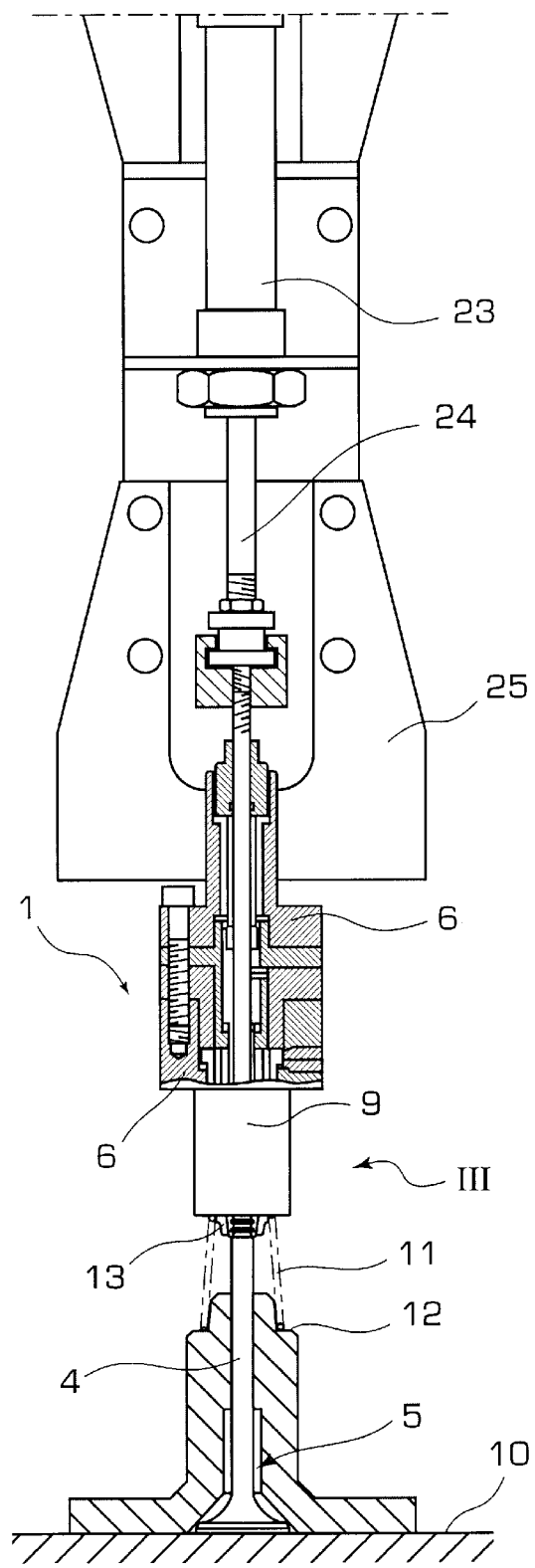
FIG. 2 is a view partially in cross section of an embodiment of the device according to the invention.
Figure 3:
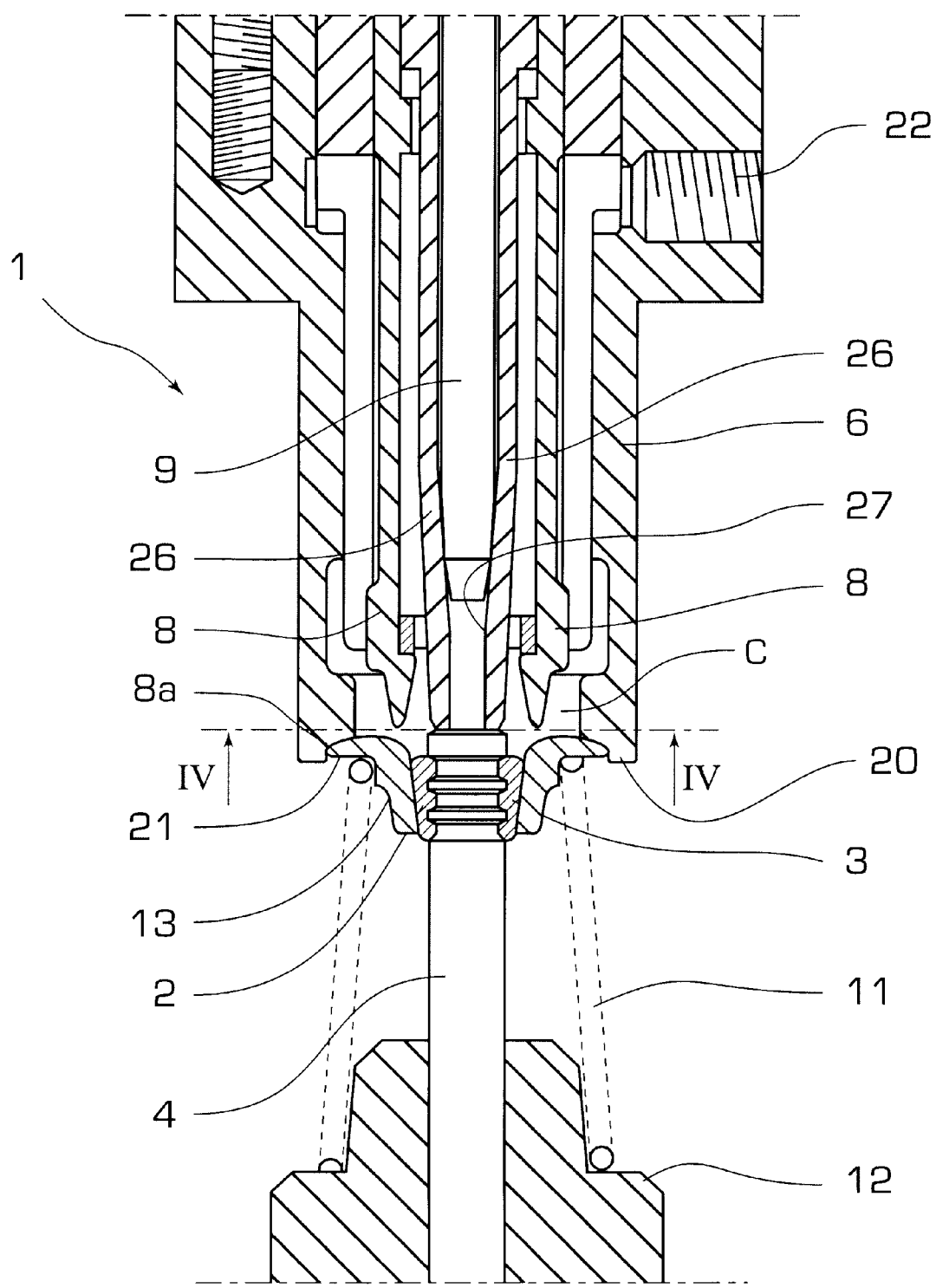
FIG. 3 is a view at an enlarged scale of a detail indicated by arrow III in FIG. 2.
Figure 4:
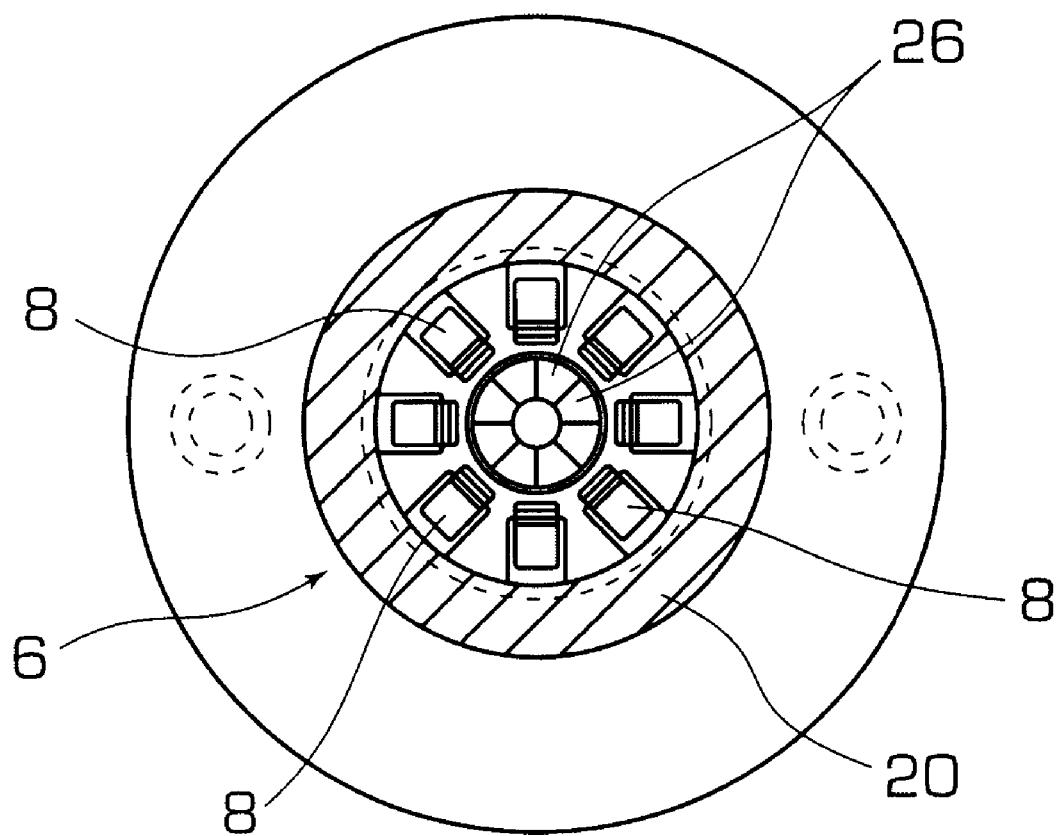
FIG. 4 is a view along line IV—IV of FIG. 2.

FIGS. 2–4 show an embodiment of the device according to the invention. In these figures, parts corresponding to those of FIG. 1 are designated by the same reference numeral.

The main difference with respect to the previously proposed solution shown in FIG. 1 lies in that in the case of the device according to the invention shown in FIGS. 2–4, the tubular body 6 encloses the deflectable jaws 8 inside thereof and has a continuous front edge 20 having an annular inner recessed portion 21 which is for engaging the cup element 13.

The tubular body 6 thus defines a chamber C inside thereof which is closed by the flange of the cup element 13 when this flange is engaged by the front edge 21 of the tubular body 6. This tubular body further comprises a connecting means 22 which is to be connected to a circuit for feeding pressurized air (not shown).

The device according to the invention is used in a way absolutely similar to what has been described with reference to the previously proposed device shown in FIG. 1. FIGS. 2, 3 show the device in the condition in which it stands when assembling of the two cone half-bits has been completed. In use, once this condition has been reached, pressurized air is fed into chamber C. If assembling of the two cone half-bits 2, 3 is not proper, some air will leak between them and the valve stem 4 or between the cone half-bits and the cup element 13, so that the pressure in chamber C will decrease. Therefore, by checking the pressure in this chamber, it is possible to check the quality of the assembling of the cone half-bits in a simple and rapid way, at the same station of the engine assembling line at which the assembling of the cone half-bits is carried out.

With reference to FIGS. 2–4, the embodiment shown therein further differs from the solution shown in FIG. 1 for a number of features. Rather than by the spring 14, the position of pushing rod 9 is indeed controlled by a fluid cylinder 23 having a stem 24 connected to the pushing rod 9, whereas the tubular body 6 is anchored to a supporting structure 25 which is moved vertically in order to carry out the assembling of the cone half-bits. Therefore, in this case in active control on the position of the pushing rod 9 is obtained, rather than a passive control as in the case of FIG. 1, so as to obtain a better control of the inserting stage of the cone half-bits. However, it is clearly apparent that the device according to the invention may also be used with an arrangement similar to that of FIG. 1 as regards the control of the position of the pushing rod 9, i.e. by a spring similar to spring 14 of FIG. 1, in lieu of cylinder 23.

A further important feature of the device according to the invention lies in that the pushing rod 9 engages the inner surfaces of the deflectable jaws 8 with the interposition of a plurality of deflectable petals 26 (see in particular FIG. 4) which define a tubular body within which the rod 9 slides, these petals being able to open radially outwardly, following the engagement of the rod 9 within a conical end portion 27 of the inner passage defined between the petals 8. The adoption of these petals enables the diverging movement of the two cone half-bits 2, 3 to be obtained by engaging the petals within the cone half-bits, without any relative sliding movement between the pushing rod 9 and the cone half-bits, which could give rise to drawbacks in operation.

Naturally, while the principle of the invention remains the same, the details of construction and the embodiments may widely vary with respect to what has been described and illustrated purely by way of example, without departing from the scope of the present invention.

What is claimed is:

1. Inserting device for automated assembling of cone half-bits on the stem of a valve of an internal combustion engine, said valve being of the type comprising a mushroom-shaped body including a stem on whose free end a cup element is to be secured having an inner conical surface tapering towards the mushroom-shaped head of the valve and an outer annular flange for abutment of one or more helical return springs for the valve, said cup element being secured on said end of the stem of the valve with the interposition of an annular body having a conical outer surface, which is also tapered towards the mushroom-shaped head of the valve, defined by two cone half-bits which are freely in contact with each other at a plane containing the axis of said annular body, said cone half-bits defining one or more ribs in their assembled condition which are for engaging cooperating circumferential grooves provided on said end of the valve stem, said device comprising means for assembling said cone half-bits by causing them to slide on the valve stem while holding them in a diverging condition, with their ends of lower diameter spaced apart from each other, said means including a tubular body adapted to be moved along an axis coincident with the axis of the valve stem and adapted to engage the annular flange of the cup element, said tubular body being further provided with a plurality of jaws elastically deflectable outwardly in a radial direction and having inclined inner surfaces diverging from each other in the direction of the mushroom-shaped head of the valve and adapted to engage the end surfaces of the two cone half-bits, said inserting device further including a pushing rod slidably mounted within the tubular body and ending with a tip which is to be introduced between the two cone half-bits and for cooperation with said jaws for holding the two cone half-bits in said diverging position until they reach their axial assembling position on the stem, wherein said tubular body defines an end chamber inside thereof which is closed by said annular flange of the cup element when the flange is engaged by said tubular body, said device further including means for feeding pressurized air into said chamber and means for checking any pressure losses in said chamber caused by air leakages due to an improper assembling of the two cone half-bits and wherein said pushing rod is slidably mounted within a sleeve defined by a plurality of longitudinal petals which are elastically deflectable in a radial direction outwardly due to the engagement of said pushing rod within a conical end of the inner passage defined by said petals, said petals on their turn being adapted to engage inside the two cone half-bits.

2. Inserting device according to claim 1, wherein said tubular body encloses said elastically deflectable jaws inside thereof.

3. Inserting device according to claim 1, wherein the pushing rod is subjected to the action of a return spring.

4. Inserting device according to claim 1, wherein the pushing rod is connected to the stem of a fluid cylinder which controls the position thereof.

\* \* \* \* \*